(12) United States Patent
Sugiura et al.

(10) Patent No.: US 6,222,950 B1
(45) Date of Patent: *Apr. 24, 2001

(54) IMAGE PROCESSING WITH CONVERSION FROM N-VALUE TO M-VALUE DATA

(75) Inventors: Susumu Sugiura, Atsugi; Yoshinobu Mita, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/384,220

(22) Filed: Feb. 6, 1995

Related U.S. Application Data

(60) Continuation of application No. 07/975,116, filed on Nov. 12, 1992, now abandoned, which is a division of application No. 07/673,656, filed on Mar. 22, 1991, now abandoned.

(30) Foreign Application Priority Data

| Mar. 23, 1990 | (JP) | 2-074756 |
| Jun. 13, 1990 | (JP) | 2-154321 |
| Jun. 13, 1990 | (JP) | 2-154322 |

(51) Int. Cl.$^7$ .................................................. G06K 9/32
(52) U.S. Cl. ........................ 382/299; 358/262.1; 358/429
(58) Field of Search ............................. 382/56, 237, 299; 358/426, 261.1, 261.4, 455, 462, 429, 262.1; 348/391, 393

(56) References Cited

U.S. PATENT DOCUMENTS

| 4,819,063 | * | 4/1989 | Sugiura et al. ...................... 358/530 |
| 4,899,225 | * | 2/1990 | Sasuga et al. ....................... 358/462 |
| 4,905,294 | | 2/1990 | Sugiura et al. ........................ 382/50 |
| 5,014,124 | * | 5/1991 | Fujisawa ............................. 358/462 |
| 5,038,208 | * | 8/1991 | Ichikawa et al. ...................... 358/75 |
| 5,060,059 | * | 10/1991 | Mori et al. ............................. 358/80 |
| 5,572,606 | * | 11/1996 | Tanioka ............................... 358/429 |

* cited by examiner

Primary Examiner—Matthew C. Bella
(74) Attorney, Agent, or Firm—Fitzpatrick, Cella, Harper & Scinto

(57) ABSTRACT

An image processing method is disclosed in which a pattern for detecting a line image is compared with the value of image data within a predetermined window of the original image. N-value data is transformed to M-value data based on the result of this comparison. An image can thus be satisfactorily M-value coded without being adversely affected by noise.

22 Claims, 11 Drawing Sheets

FIG. 2
| $a_{11}$ | $a_{12}$ | $a_{13}$ |
|---|---|---|
| $a_{21}$ | $a_{22}$ | $a_{23}$ |
| $a_{31}$ | $a_{32}$ | $a_{33}$ |
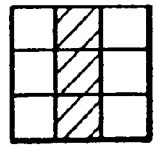 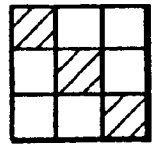
FIG. 3(A)   FIG. 3(B)
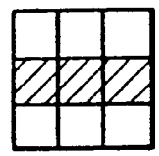 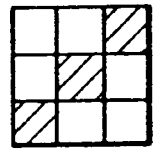
FIG. 3(C)   FIG. 3(D)
FIG. 4
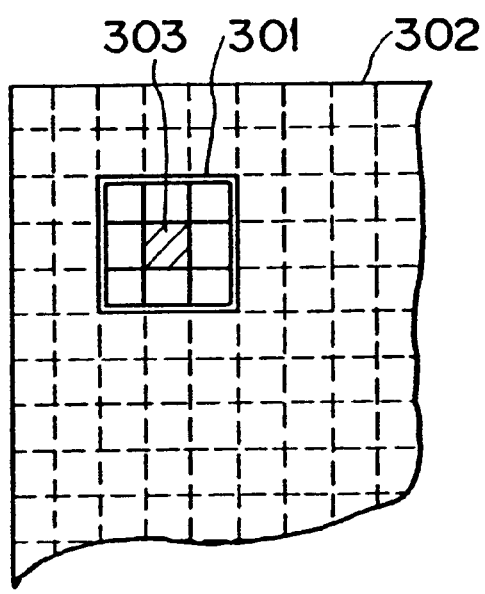

| 1/9 | 1/9 | 1/9 |
|---|---|---|
| 1/9 | 1/9 | 1/9 |
| 1/9 | 1/9 | 1/9 |

| 1/16 | 2/16 | 1/16 |
|---|---|---|
| 2/16 | 4/16 | 2/16 |
| 1/16 | 2/16 | 1/16 |

| 0 | 0 | 0 |
|---|---|---|
| 0 | 1 | 0 |
| 0 | 0 | 0 |

| 0 | 0 | 0 | 0 | 0 |
|---|---|---|---|---|
| 0 | 1 | 2 | 1 | 0 |
| 0 | 2 | 4 | 2 | 0 |
| 0 | 1 | 2 | 1 | 0 |
| 0 | 0 | 0 | 0 | 0 |

3 x 3

| 1 | 2 | 3 | 1 | 2 |
|---|---|---|---|---|
| 2 | 4 | 6 | 4 | 2 |
| 3 | 6 | 9 | 6 | 3 |
| 2 | 4 | 6 | 4 | 2 |
| 1 | 2 | 3 | 1 | 2 |

5 x 5

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

| $f11$ | $f12$ | $f13$ | $f14$ | $f15$ |
|---|---|---|---|---|
| $f21$ | $f22$ | $f23$ | $f24$ | $f25$ |
| $f31$ | $f32$ | $f33$ | $f34$ | $f35$ |
| $f41$ | $f42$ | $f43$ | $f44$ | $f45$ |
| $f51$ | $f52$ | $f53$ | $f54$ | $f55$ |

IMAGE PROCESSING WITH CONVERSION FROM N-VALUE TO M-VALUE DATA

This application is a continuation-in-part of application Ser. No. 07/975,116, filed Nov. 12, 1992, now abandoned, which was a division of application Ser. No. 07/673,656, filed Mar. 22, 1991, now abandoned.

BACKGROUND OF THE INVENTION

1. Field of the Invention

The present invention relates to a method of transforming an N-value image to an M-value image.

2. Related Background Art

An adaptive multi-value coding method has been hitherto known in which a distinction is made between a character portion and an (non-character) image portion of the original image so as to perform processes (types of processing) respectively suitable for the various portions based on the result of this distinction.

Such a conventional adaptive multi-value coding method employs a systematic dither method. The systematic dither method is employed because a threshold matrix array of the original binary image is fixed beforehand, so that the size of the threshold matrix can be estimated by performing pattern matching with the binary image.

In a binarizing method of a density preserving type for error diffusion or the like, the size of the threshold matrix is not fixed, nor is it estimated by pattern matching. Thus, image data which has been binarized by this binarizing method cannot be satisfactorily restored to the form of multi-value data.

On the other hand, conventional facsimile equipment has mainly performed binary monochromatic image communication. It seldom performs color image communication in view of the fact that no high performance color printer exists.

Thus, technology that may be encountered in relation to color image communication is not well understood. In actuality, almost no examination has been conducted concerning technology and circuitry used for transforming a binary image to a multi-value image.

In conventional processes for multi-value restoration, tables are utilized which hardware in actual use cannot hold; operation speed is not taken into account; and problems that may arise only when such a conventional process is employed with other image processing are not understood.

For example, when a binary color image is output by a high performance color printer where an image is received (on a receiving end), it must undergo various processes, such as a masking process adjusted to the developer of the color printer, and an MTF correcting process, before it can be output. Otherwise, the high performance color printer does not make use of its performance to the fullest extent. Also, even when a binary image undergoes image processes without being transformed to a multi-value image, it is not effectively processed and may be adversely affected. As a result, the resolution of characters deteriorates.

The assignee of the present invention, has proposed technology wherein it is determined whether or not a binarized image pattern is a half-tone image that has been processed by the dither method. A multi-value coding method is controlled based on the result of the determination.

There is room for improvement in such technology in that an image to be processed corresponds to a half-tone image, such as that processed for an error diffusion, which is not processed by a dither method.

SUMMARY OF THE INVENTION

In view of the above, an object of the present invention is to provide an image processing method and/or apparatus.

Another object of this invention is to provide an image processing method and/or apparatus which can precisely transform image data.

Still another object of the invention is to provide an image processing method and/or apparatus which can precisely transform an N-value image to an M-value image (N<M).

In accordance with a preferred embodiment of the invention, an image processing method is disclosed in which a pattern for detecting a line image is compared with the value of image data within a predetermined window of the original image. An N value is transformed to an M value based on the result of this comparison. An image can thus be satisfactorily M-value coded without being adversely affected by noise.

Yet another object of the invention is to provide an image processing method and/or apparatus having a simple construction which can restore an N-value image to an M-value image.

A further object is to provide facsimile equipment having a novel structure.

An even further object of the invention is to provide an apparatus having a simple construction which is capable of processing data of plural color components when the data of the plural color components are fed sequentially.

Other objects and features of the present invention will be apparent from the following description and drawings.

BRIEF DESCRIPTION OF THE DRAWINGS

FIG. 2 is a schematic view showing a window for detecting a thin line portion used in the first embodiment;

FIGS. 3(A) to 3(D) are schematic views showing examples of patterns used for detecting the thin line portion in the first embodiment;

FIG. 4 is a schematic view showing the relationship among the original image, the window, and an attention point;

DETAILED DESCRIPTION OF THE PREFERRED EMBODIMENTS

Figure 1:
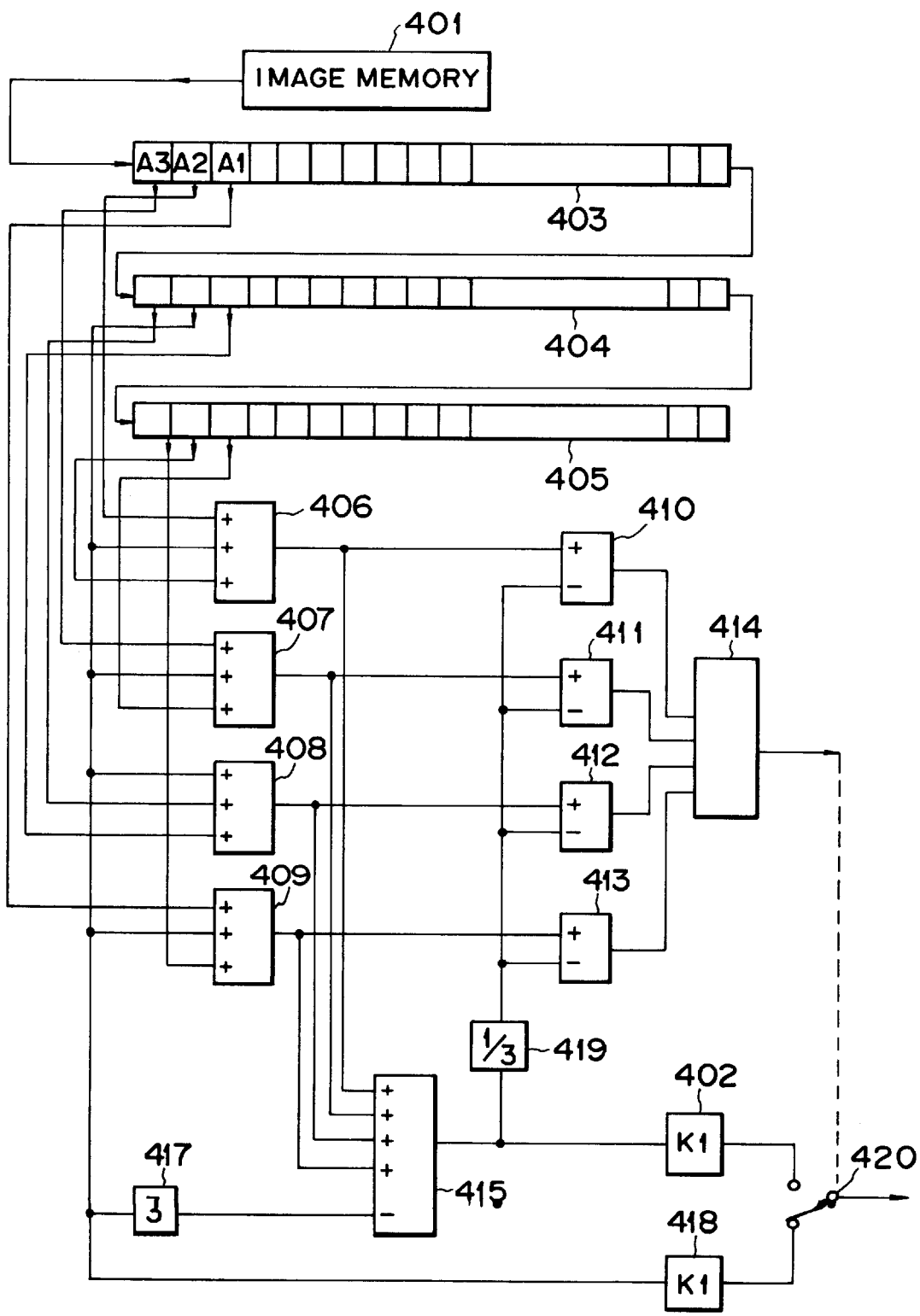
FIG. 1 is a circuit diagram showing an image region determining circuit in accordance with a first embodiment of the present invention.

FIG. 1 is a circuit diagram showing an image region determining circuit in accordance with a first embodiment of the present invention.

As shown in FIG. 2, in this embodiment, a 3×3 window for detecting a thin line portion is used as an example.

FIGS. 3(A) to (3D) shows examples of patterns used for detecting the thin line portion. An attention pixel is disposed in position $a_{22}$ of FIG. 2. FIG. 4 shows the relationship among the window 301, the attention pixel 303, and an original image 302. (In FIG. 4, the broken lines divide the original image 302 into pixels.) The 3×3 window 301 is arranged in the original image 302. The attention pixel 303 is positioned at the center of the 3×3 window 301.

Various elements of the image region determining circuit will now be described with reference to FIG. 1.

An image memory 401 for storing image data is composed of, for example, a hard disk device.

Shift registers 403–405 may be 3-line buffer memories. Data from the image memory 401 is output in the order $A_1$, $A_2$, $A_3$ ..., and is then input to the line buffer memory 403 in this order, from which it is further input sequentially to the line buffer memories 404 and 405.

An adder 406 is a circuit used for calculating pattern (A) shown in FIG. 3; an adder 407 is for calculating pattern (B); an adder 408 for calculating pattern (C); and an adder 409 is for calculating pattern (D).

A total circuit 415 is a circuit used for inputting addition results obtained by the four adders 406–409 to determine the sum of image data in the 3×3 window 303. A triple circuit 417 receives as its input the value of the attention pixel input to the four adders 406–409. Since attention pixel data of input data is present fourfold (includes four times) in the total circuit 415, the triple circuit 417 is a circuit in which triple data for the attention pixel data three times the value of the data for that pixel) is subtracted from the fourfold data so as to obtain proper data.

A ⅓ circuit 419 is used for converting the data of nine pixels (3×3) from total circuit 415 into a data value equal to the amount of three pixels.

Subtracting circuits 410–413 are used for calculating the difference between components of all the patterns and a mean value of the window, and for equivalently calculating components of a line image so as to obtain the results.

A maximum value circuit 414 is a circuit for obtaining a maximum absolute value of the components of the respective patterns (A)–(D), and in the end outputs the line image.

In such a construction, the energy of the 3×3 window is reduced to ⅓ with respect to noise signals present as separate or isolated dots. Incorrect determination of a line image caused by noise is thus decreased. As the size of the window increases to 5×5, 7×7, and so on, the line image determination is less negatively affected by noise.

K once circuit 402 outputs, in the form of a multivalue datum, the product of a mean value of the 3×3 window multiplied by K.

On the other hand, K once circuit 418 outputs the product of the data of the attention pixel multiplied by K.

Control data from a line image detecting portion (maximum value circuit 414) actuates a switch 420. If given data appears to pertain to a line image, the switch 420 is switched over to the K once circuit 418, while on the other hand, if it appears to pertain to an image portion, the switch 420 is switched over to the K once circuit 402.

In the above embodiment, although a line image detecting method has been described which uses 3×3 patterns, any N×M patterns may be employed to detect a line image. The size of a P×Q multi-value-coding matrix may also be employed.

Also, as shown in FIG. 2, the line image patterns have been discussed in the case of a white background. However, even when the white background is reversed, patterns similar to those in FIG. 2 can be prepared for the reversed background. The size of the multi-value-coding matrix may be further multi-value-coded with a weight.

In this embodiment, if the adders 406–409 are composed of AND circuits, and if the subtracting circuits 410–413 are composed of OR gates, pattern matching would make it possible to determine whether or not a given image appears to be a line image. In addition, increasing the size of a matrix used for such determination can improve the precision of the determination.

As has been explained above, the present invention stably detects the line image portions of a character or the like, whereby a good line image can be reproduced in accordance with a binary image of the original.

Also, the frequency at which line images are incorrectly determined due to noise is reduced, which fact eliminates the deterioration of the image.

Moreover, if an image region near a line image, i.e., an image region with high-frequency components, is multi-value-coded by means of a small multi-value matrix, the multi-value-coded data is suitable for use for high resolution recording. Conversely, if a portion which has been detected as an image portion is multi-value-coded by means of a large multi-value matrix, the multi-value-coded data is suitable for use for high tone recording.

As has been described above, in accordance with this embodiment, N-value image data can be satisfactorily transformed to M-value image data without being adversely affected by noise.

Figure 5:
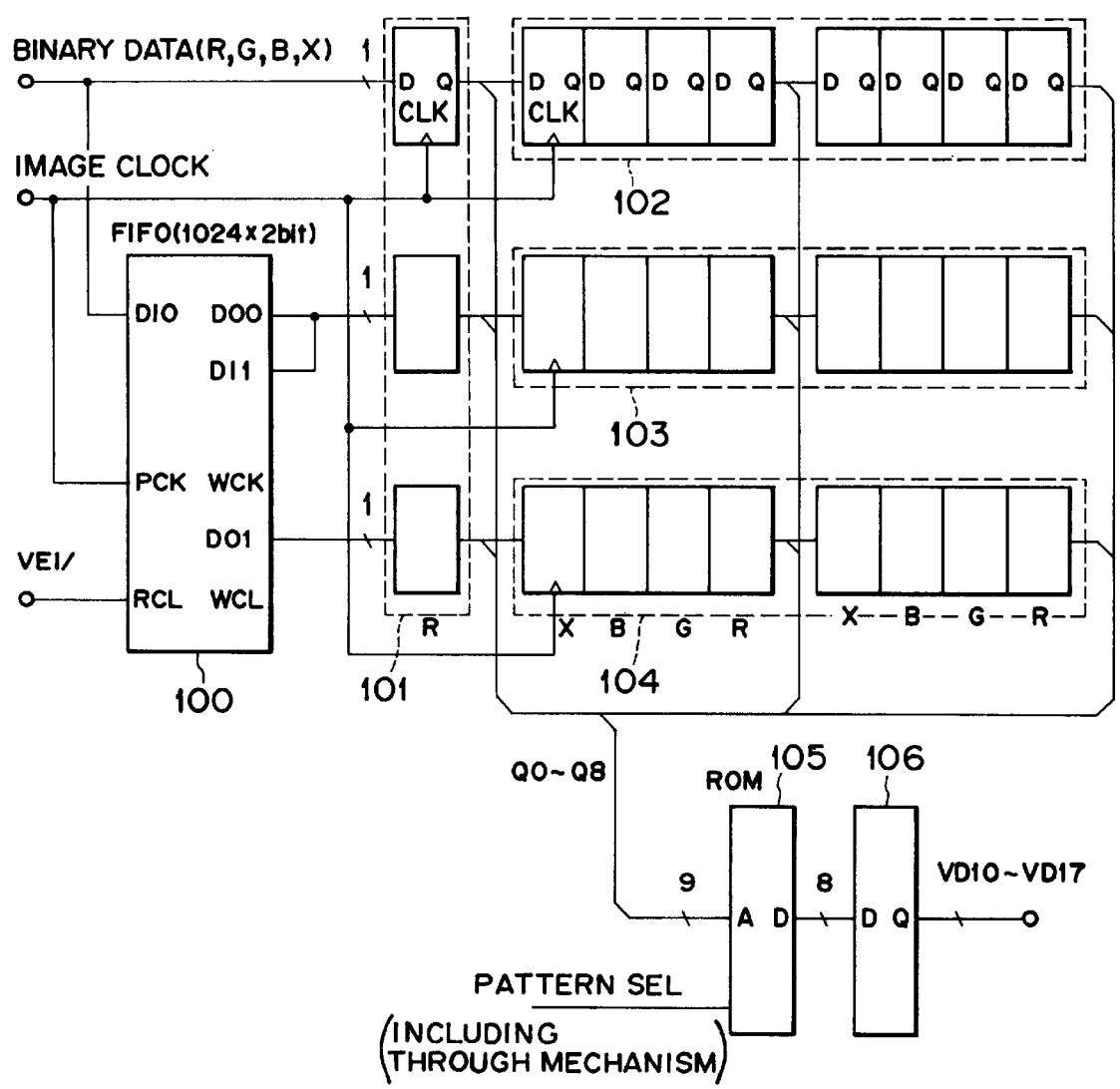
FIG. 5 is a block diagram showing a second embodiment of the present invention.

FIG. 5 is a block diagram showing a second embodiment of the present invention.

In accordance with this embodiment, an image processing apparatus multi-value-codes input binary image data based on dot patterns within a 3×3 window. This multi-value-coding is performed with reference to a table.

A FIFO memory 100 for delaying a line unit of image data using 1024×2 bits; latch columns 101–104 for delaying a pixel unit of the image data; a ROM 105 for storing a plurality of tables, as shown in FIG. 6, which perform filtering; and a latch 106 for latching output data from the ROM 105, are all arranged in a processing unit of the image processing apparatus.

In such an image processing apparatus, binary image data received from the outside is first input to the FIFO memory 100.

The FIFO memory 100 delays the binary image data equal to the amount of one line. Data equal to a total of three lines is then input to the latch columns 101–104. Data of a 3×3 pixel (or section) adjacent to the data equal to the total of three lines is fetched and fed to the ROM 105 as an address of the ROM 105. Eight-bit data is obtained as a result.

In this embodiment, color component data items of R, G, B, and X (black data) are serially input to the processing unit in the form of binary data, so that all color component data items of R, G, B, and X are sequentially arranged and latched bit by bit in the latch columns 102–104. Thus binary data of a continuous set of 3×3 pixels with the same color component is retrieved by retrieving data, four bits by four bits, from the latch columns 102–104.

The ROM 105 is capable of changing the contents of multi-value restoration tables using a pattern SEL signal in accordance with a character image mode, a half-tone image mode, a mixed image mode of character/half-tone, etc.

Filters are selected in accordance with what image characteristics are stressed. For instance, for the half-tone image mode, the table of FIG. 6(*a*) is selected; for the mixed image mode of character/half-tone, the table of FIG. 6(*b*) is selected; and for the character image mode, the table of FIG. 6(*c*) is selected.

By using the table of FIG. 6(*a*), a multi-value image can be smoothly obtained; by using the table of FIG. 6(*b*), an image can be obtained which meets both a smooth tone and the retention of sharp edges of a character or the like; and by using the table of FIG. 6(*c*) the edges of a character or the like can be output without deteriorating them. The table of FIG. 6(*c*) is used to directly output binary data in the case of a pseudo-hald-tone image mode.

The ROM 105 further has a through mechanism which passes data to the respective tables.

In this embodiment, because there is substantially no difference in a value converted (restored) from a binary value to a multi-value datum with respect to the respective color components, the use of tables commonly used for the respective color components helps to reduce the volume of the tables.

By adding two bits to the pattern SEL signal, the contents of multi-value restoration tables are switched from a basis of color components to that of pixels. In such a case, multi-value restoration data for the respective colors is written in four tables which correspond to the two bits.

Also, with color facsimile equipment or similar equipment having a built-in through mechanism, when an image mode, such as a character image, a half-tone image, or the mixed image mode of character/half-tone, is selected where an image is sent (on a transmitting end), a signal is received based on a protocol where the image is received (on a receiving end). The SEL signal thus switches the contents of the multi-value restoration tables.

When the protocol between both ends of transmission does not specify such an image mode, an image mode may be selected on a receiving end.

In such a construction, if the multi-value restoration tables of the ROM 105 are in the mixed image mode, edge and half-tone portions can be effectively reproduced. If one wants to stress a document image in particular, selecting the character image mode prevents the resolution from deteriorating. Also, if the multi-value restoration tables are always set in the half-tone image mode, the tone is stressed during multi-value coding. Processes, such as masking and tone conversion, are performed effectively for an image which has been multi-value coded.

Figure 7:
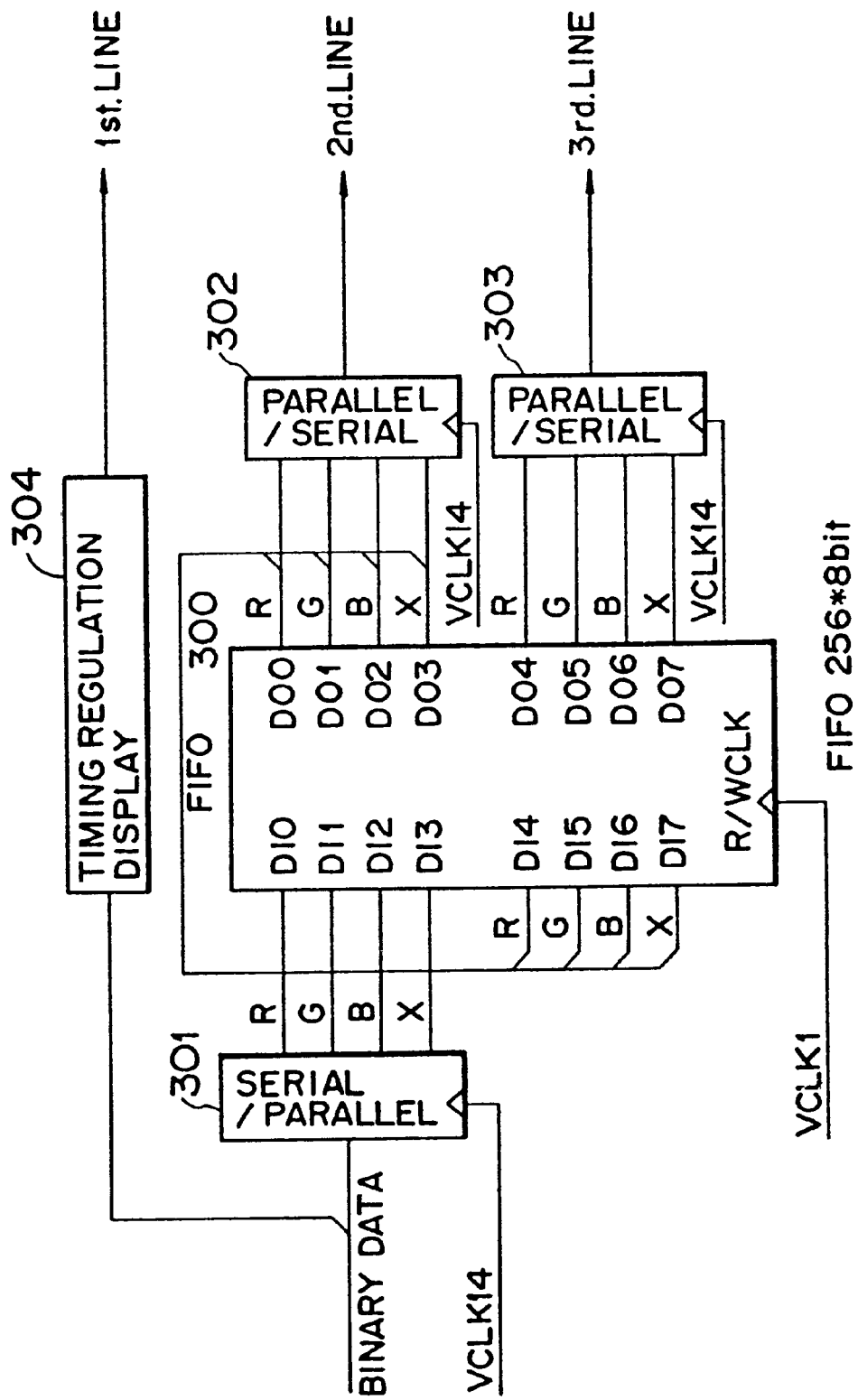
FIG. 7 is a block diagram specifically showing the second embodiment of this invention.

FIG. 7 is a block diagram showing the second embodiment of this invention.

In the previously mentioned second embodiment, the pixels of color components of R, G, B, and X are stored in the FIFO memory 100 in dot sequence. However, if a serial-parallel converting unit 301 shown in FIG. 7 is disposed in front of a FIFO memory 300, and if serial-parallel converting units 302 and 303 are disposed at the back of the FIFO memory 300, then the FIFO memory 300 may be of 256×4×2 bits type, that is, 256×8 bits type, being capable of processing data using a short address length.

Serial binary data items which are input in the order R, G, B, and BK in dot sequence are first input to the serial-parallel converting unit 301 and a timing regulation display 304 as well.

The serial-parallel converting unit 301 outputs, in parallel, image data items in dot sequence at the same time. The image data items are then input to input terminals DI0–DI3 or line buffers of the FIFO memory 300 so as to be delayed by an amount equal to one line, and are output to output terminals D00–D03. The output data items are in turn input to input terminals DI4–DI7 so as to be delayed again by an amount equal to one line. These data items are delayed in by amount equal to a total of two lines before being output to output terminals D04–D07.

Continuous data equal to the amount of three lines in a vertical direction is thus obtained. The output terminals (D00–D03 and D04–D07) of the FIFO memory 300 again convert time-wise a parallel state of R, G, B, and BK into a serial state, and output the continuous data in the form of one-bit signals.

In the same manner as in the first embodiment, image data of the first to third lines is input to the latch columns 102–104, undergoing a multi-value image restoration process in the ROM 105.

As a result, the FIFO memory 300 having a short address length is capable of processing the image data by using a data width of eight bits.

Figures 6A, 6B, 6C, 8:
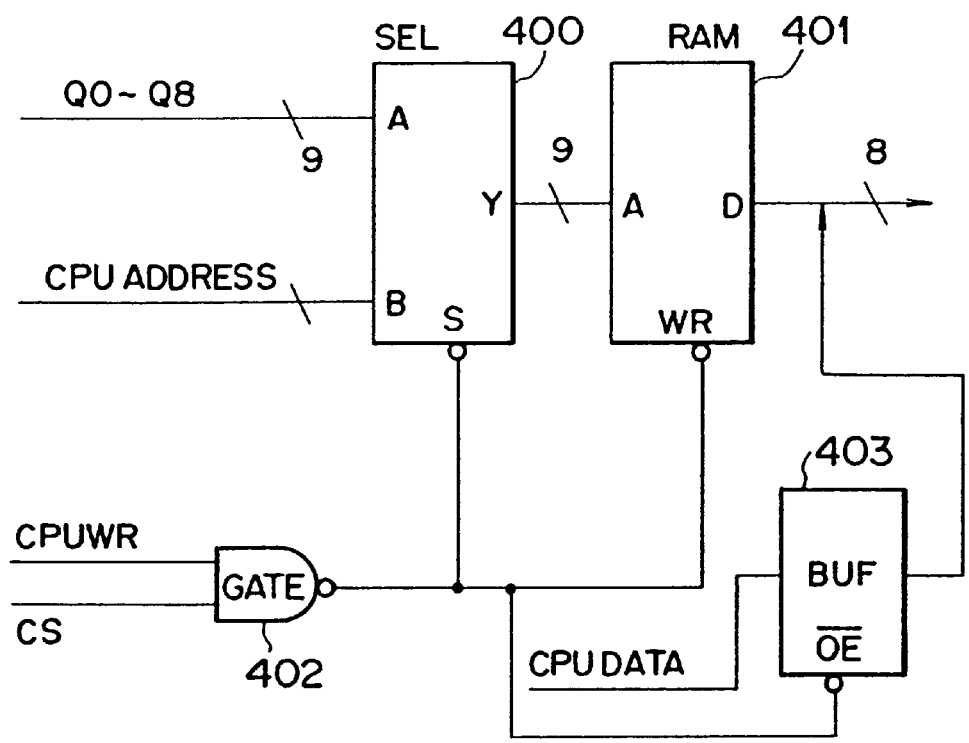
FIGS. 6(a) to 6(c) are schematic views illustrating tables for filtering used in the first embodiment.
FIG. 8 is a block diagram illustrating a modification of the second embodiment of the invention.

FIG. 8 illustrates a third embodiment of the invention.

In the embodiments mentioned above, though ROM 105 is used as a look up table (LUT), a RAM may also be used in the structure shown in FIG. 8.

In this case, a control operation is necessary for writing multi-value restoration data from a CPU to the RAM.

Continuous binary image data items Q0–Q8 of 3×3 pixels, generated in the same way as in the first embodiment, are input to a selector (SEL) 400. A CPU address is also input from the CPU to the SEL 400. Either of the above two inputs is selected to feed it to the address of a ROM 401, whereby multi-value data is output.

Ordinarily, when a multi-value image is restored, the binary image data items Q0–Q8 are output from the selector 400, whereas multi-value restoration data is output from the RAM 401. On the other hand, when the CPU writes the multi-value restoration data into the RAM 401, a writing signal CPUWR from the CPU and a selecting signal CS from the RAM 401 go to a "1", respectively, and a gate 402 outputs a "0".

The "0" from the gate 402 is input to a selection control terminal S of the selector 400, a read/write terminal WR of the RAM 401, and to an output enable terminal OE (negative logic) of a buffer (BUF) 403. At this stage, the selector 400 selects the CPU address before outputting it. The RAM 401 changes from a reading state to a writing state, while at the same time, a data line of the CPU, i.e., CPU data is output through the buffer 403 to a data line of the RAM 401. Data from the CPU is thus written in the RAM 401.

It is also possible to perform, as another embodiment, the same process as in the first embodiment by using a 5×5 window. In such a case, however, as many as 25 pixels are referred to, so that it is difficult to build the needed tables in a single memory. Two embodiments describing two constructions will be given: one construction for processing data by using multiplication/addition computation, and the other for processing data by separating the tables into several memories.

Figure 9:
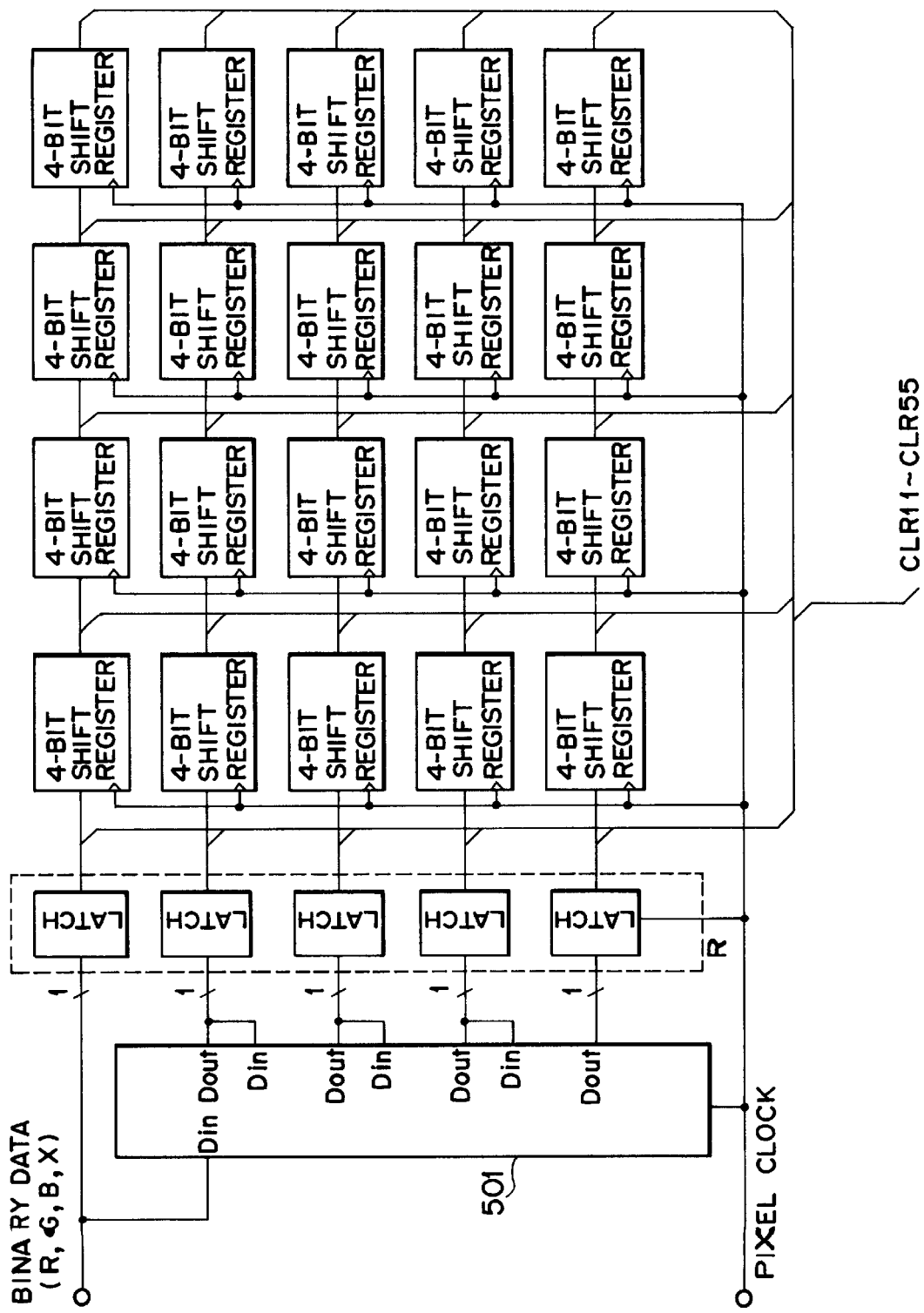
FIG. 9 is a block diagram showing circuitry for shifting 25 pixels (5×5), used in a third embodiment.

(1) Construction in which data is processed by using the multiplication/addition computation FIG. 9 is a block diagram showing circuitry which shifts 25 pixels (5×5).

A simple enlargement of the construction with respect to the 3×3 window in the second embodiment shown in FIG. 5 results in this construction of item (1). In other words, numeral 501 denotes a line buffer used for delaying data by an amount equal to four lines. The line buffer 501 may be employed for both the construction using multiplication/addition computation and that using tables separated into memories.

The circuit for performing the multiplication/addition computation is divided into a multiplication unit and an addition unit.

Figure 10:
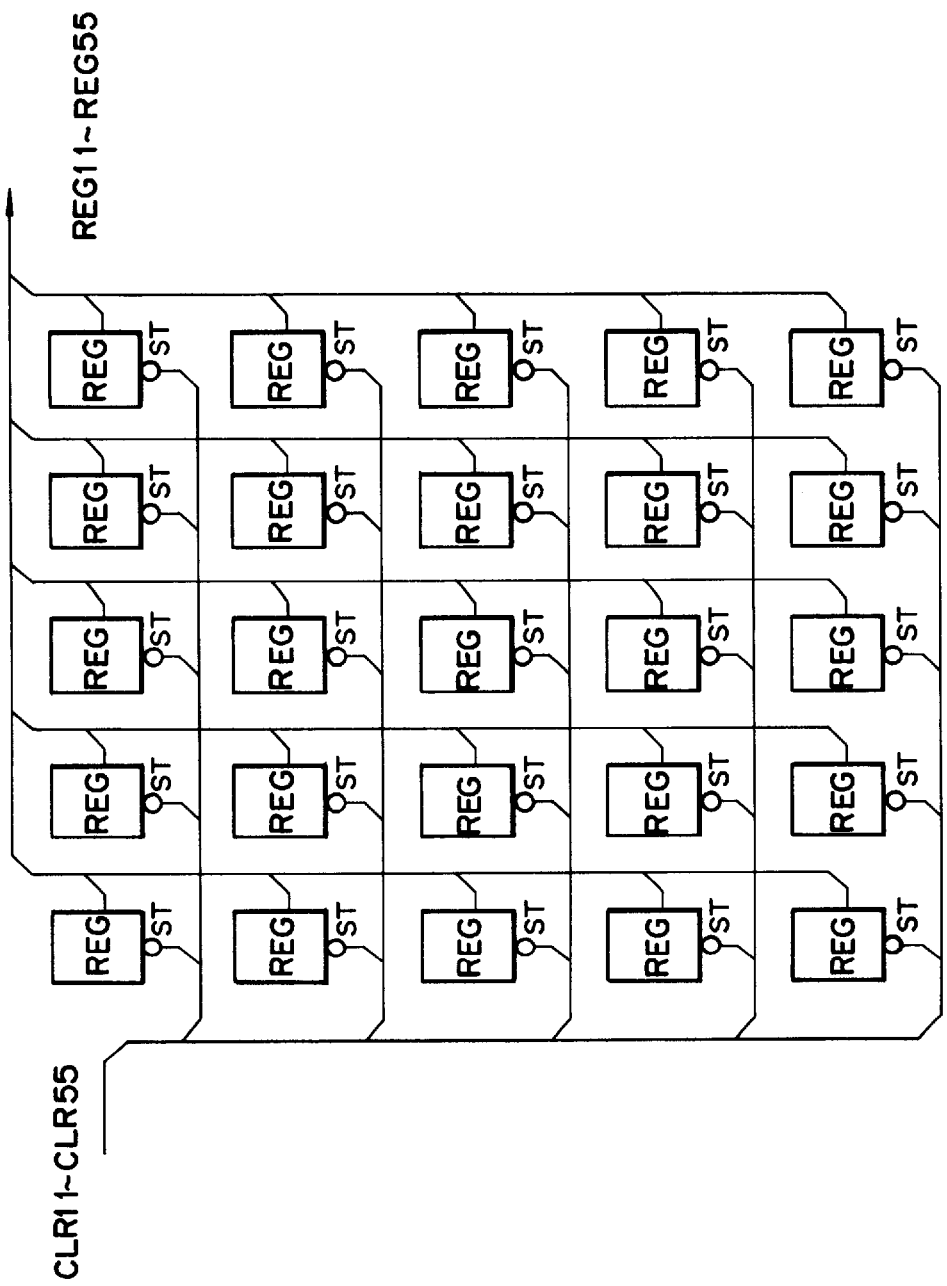
FIG. 10 is a block diagram showing the construction of the multiplication section of a multiplication/addition computing circuit in the third embodiment of this invention.

FIG. 10 illustrates the construction of the multiplication unit.

The multiplication unit is made up of 25 registers (REG's), each having an output of about four bits. The filter coefficient sent from the CPU is written in each of the 25 registers. Only when the input from an ST is at a "0", will the respective registers output a "1", and when it is at a "1", these registers output a present coefficient. Since input signals CLR11–CLR55 are each binary data items, input image data is multiplied by a space filter based on these input signals.

Figure 11:
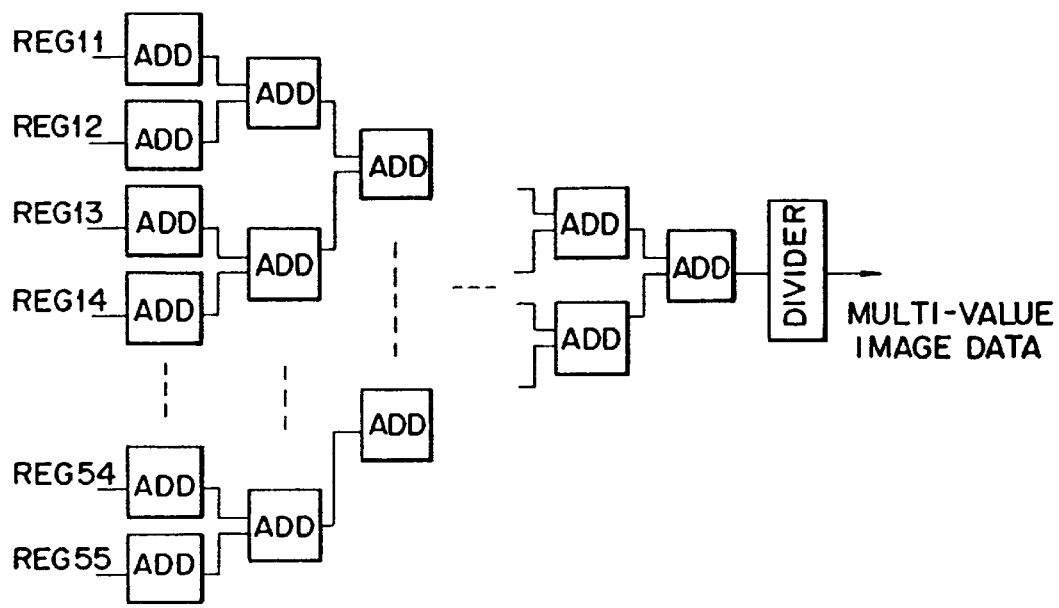
FIG. 11 is a block diagram showing the addition section of the multiplication/addition computing circuit in the third embodiment of the invention.

FIG. 11 is a block diagram illustrating the addition unit which is composed of 24 adders (ADD's) and one divider.

As mentioned above, the FIFO memory 501 shown in FIG. 9 is used for delaying data in an amount equal to one line. The data which has been delayed is again input to the FIFO memory 501 so as to be delayed once again in an amount equal to another one line. As a result, data delayed in an amount equal to one to four lines is obtained.

The delayed data is merged with data which is not delayed, and the timing of merged data items of five lines is adjusted by latches so to continuously flow in a vertical direction. The data items are then input to the respective 4-bit shift registers. The reason that 4-bit shift registers are employed in this embodiment is as follows: In a 4-bit shift register, four 1-bit latch values are stored in series, and are transferred pixel by pixel in synchronism with an image clock. Thus, in synchronism with the fact that data output from the latches is turned into R, G, B, and BK in dot sequence (pixel sequence), all of the twenty-five 4-bit shift registers are made ready for R, G, B, and BK at one time. Binary image data of a 5×5 pixel (section) which has the same attribute color and which is formed continuously in vertical and horizontal directions is obtained at CLR11–CLR15. R, G, B, and BK are output in dot sequence every time the image clock ticks.

Data CLR11–CLR55 of 25 pixels retrieved at a shift unit is input to ST terminals of the respective registers.

The filter coefficient is written beforehand by the CPU in each register, and is multiplied by either binary data "0" or "1". In the case of binary data "0", "0" is output, whereas in the case of "1", the filter coefficient itself is output (REG11–REG55).

Then, all the respective outputs from the REG11–REG55 are added in the addition unit, and then a dynamic range is adjusted through the use of the divider.

In other words, all the calculation results of the REG11–REG55 are added in the addition unit, and the sum is then divided by the divider.

When an N-bit multi-value image is restored, a value divided by the divider is expressed as $m/2^n$, where the sum of the coefficients which the CPU has set in the registers is m.

Assuming that n is 8 bits and each of the filter coefficients is 1, the divider divides as follows:

$$25/2^8 = 1/10.24$$

that is, it multiplies by 10.24.

If instructions from an operation panel and negotiation at the start of communication can determine whether an image in transmission is a half-tone image or a character image, the values of the registers, sent from the CPU, in the multiplication unit can be altered accordingly so as to make the window 3×3.

In other words, each of the coefficient is made "0", except those of the 3×3 window at the center of a 5×5 window, and the value used as the divisor in the divider is accordingly changed.

Figures 12A, 12B, 12C, 14, 15:
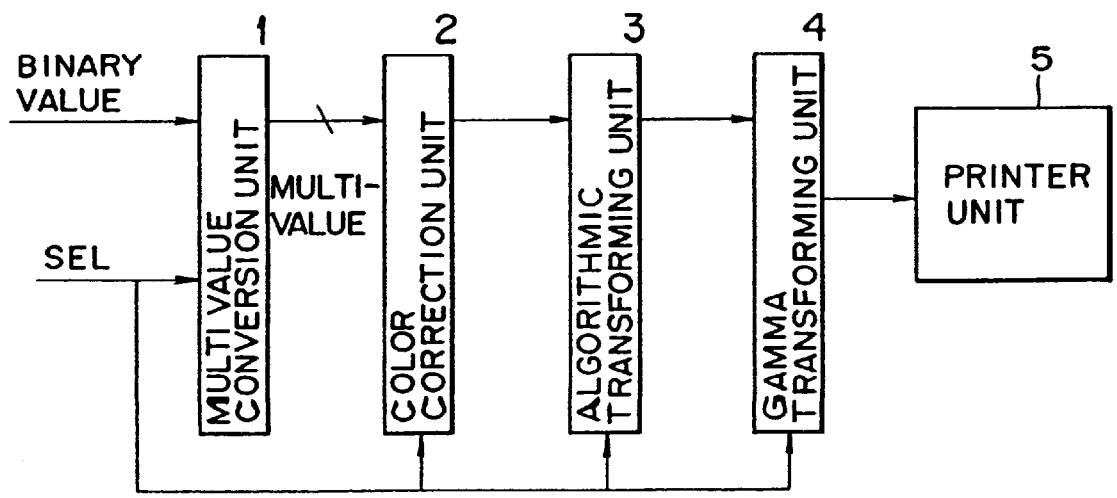
FIGS. 12(a) to 12(c) are schematic views illustrating examples of masking coefficients used in the third embodiment.
FIG. 14 is a schematic view showing the construction of filters used in the third embodiment.
FIG. 15 is a block diagram showing the overall structure of the second and third embodiments of the present invention.

FIGS. 12(a) to 12(c) are is a schematic views illustrating an example of masking coefficients.

When a 3×3 filter shown in FIG. 12(a) for restoring a character image is selected, the multi-value of the character image is more effectively restored than by a filter shown in FIG. 12(b) for restoring a half-tone image. On the other hand, when the filter of FIG. 12(b) is selected, the half-tone is effectively reproduced by the multi-value.

When the filter of FIG. 12(c) is selected, binary data which has been input is directly output, the resolution of which data does not deteriorate. The filter of FIG. 2(c) is exactly the same as that of FIG. 12(c). If the output is eight bits, it cannot be obtained except in the form of "0" or "255". This is the same as cancelling the processing for restoring a binary image to a multi-value image.

Figure 13:
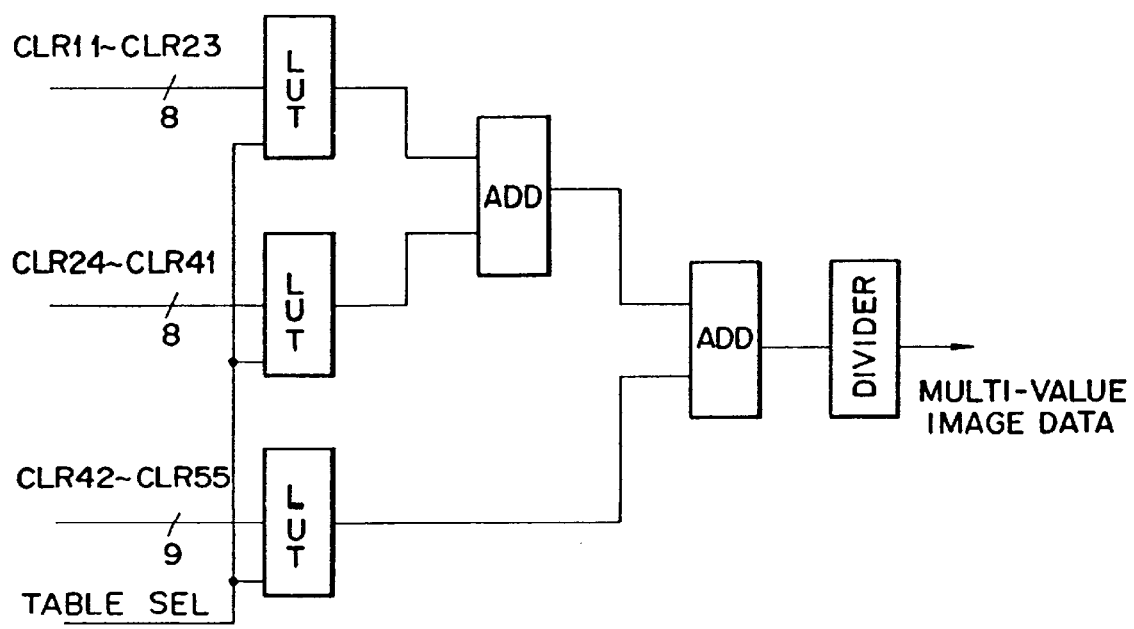
FIG. 13 is a schematic view showing an example where tables are separated into several memories.

(2) Construction in which data is processed by separating tables into several memories FIG. 13 is a schematic view showing an example where tables are separated into several memories.

In this construction, twenty-five 1-bit data items of CLR11–CLR55 from the shift unit of FIG. 9 are divided into 8-bit data items CLR1–CLR23, 8-bit data items CLR24–CLR41, and 9-bit data items CLR42–CLR55, each of which data items is fed in the form of a table address. These data items are added and adjusted to a dynamic range so as to obtain multi-value image data.

Also, in the above construction, by switching the contents of tables with the aid of a table selector signal, a 3×3 window or a 5×5 window can be obtained.

For example, in a table containing binary image data CLR11–CLR23, the value which results from the fact that image data and filters f11–f23, shown in FIG. 14, are multiplied and added together is expressed as follows:

$$\Sigma(fnm \times CLRnm)\ n,m$$

where, $(n,m)=\{(1,1), (1,2), (1,3), (1,4), (1,5), (2,1), (2,2), (2,3)\}$

Multipication/addition computation determined by actual filtering is as follows:

$$\Sigma(fnm \times CLRnm)n,m$$

However, because n=1 to 5 and m=1 to 5, when the sums calculated by three tables are added by two adders, desired filtering computation can be performed.

If given multi-value image data is expressed as "p" bits and the sum of the filter coefficient is expressed as "q" bits, the division coefficients of a divider in FIG. 13 is expressed as $q/2^K$.

A 3×3 filter or a 5×5 filter can be provided by arbitrarily setting numerical values of "f", "n", and "m".

Furthermore, if a large value of the filter coefficient is set in the center of a filter, and if a smaller value is set around the center, a multi-value image can be restored which prevents the resolution of a character and a line image from deteriorating.

An LUT (look-up table) may be composed of either a ROM or a RAM. In the case of a ROM, as illustrated in FIG. 13, if a selection line, acting as a table selector, is provided in order to switch LUT's, it is possible to store the results of computation obtained by using plural filters at the same time.

In the embodiments mentioned above, types of filters for restoring a multi-value image can be switched according to a character image mode, a half-tone image mode, or a mixed image mode. As shown in FIG. 15, a description will be given of an apparatus which has a multi-value converting unit 1 for restoring a multi-value image, a color correcting unit 2 for correcting a portion where the developer of a printer is absorbed more than necessary, an algorithmic transforming unit 3 for transforming luminance to density, and a gamma transforming unit 4 for gamma transformation.

In a character image mode, a filter is employed such as that shown in FIG. 6(c) or FIG. 12(c) to eliminate the deterioration of resolution. The output data goes to "0" or "255" (during 8-bit restoration). Thus, a half-tone cannot be reproduced. However, the main purpose of the multi-value converting unit 1 is to preserve the resolution of characters and the like. It is therefore desirable that the output go to "0" or "255" when a binary image is restored to a multi-value image.

However, if the data undergoes processes, such as algorithmic transformation, color correction, and gamma transformation, after it has been output from the multi-value converting unit 1, the value of "0" or "255" may assume another value. As a result, the range between maximum and minimum densities, i.e., a dynamic range is narrowed, thus deteriorating the reproducibility of characters and line images. What is worse, if a character is made up of seven colors, the tones of these colors are mixed up.

To prevent such a problem, a SEL, indicating a selection of a character image mode which is input in the multi-value converting unit 1, is input to the color correcting unit 2, the algorithmic transforming unit 3, and to the gamma transforming unit 4. When the character image mode is selected, data which has been input is directly output without being processed by the output sections of the above units 2 to 4.

It is thus possible for the data to be output by a printer without adversely affecting a monochrome dynamic range, resolution, or the like of a character.

Figure 16:
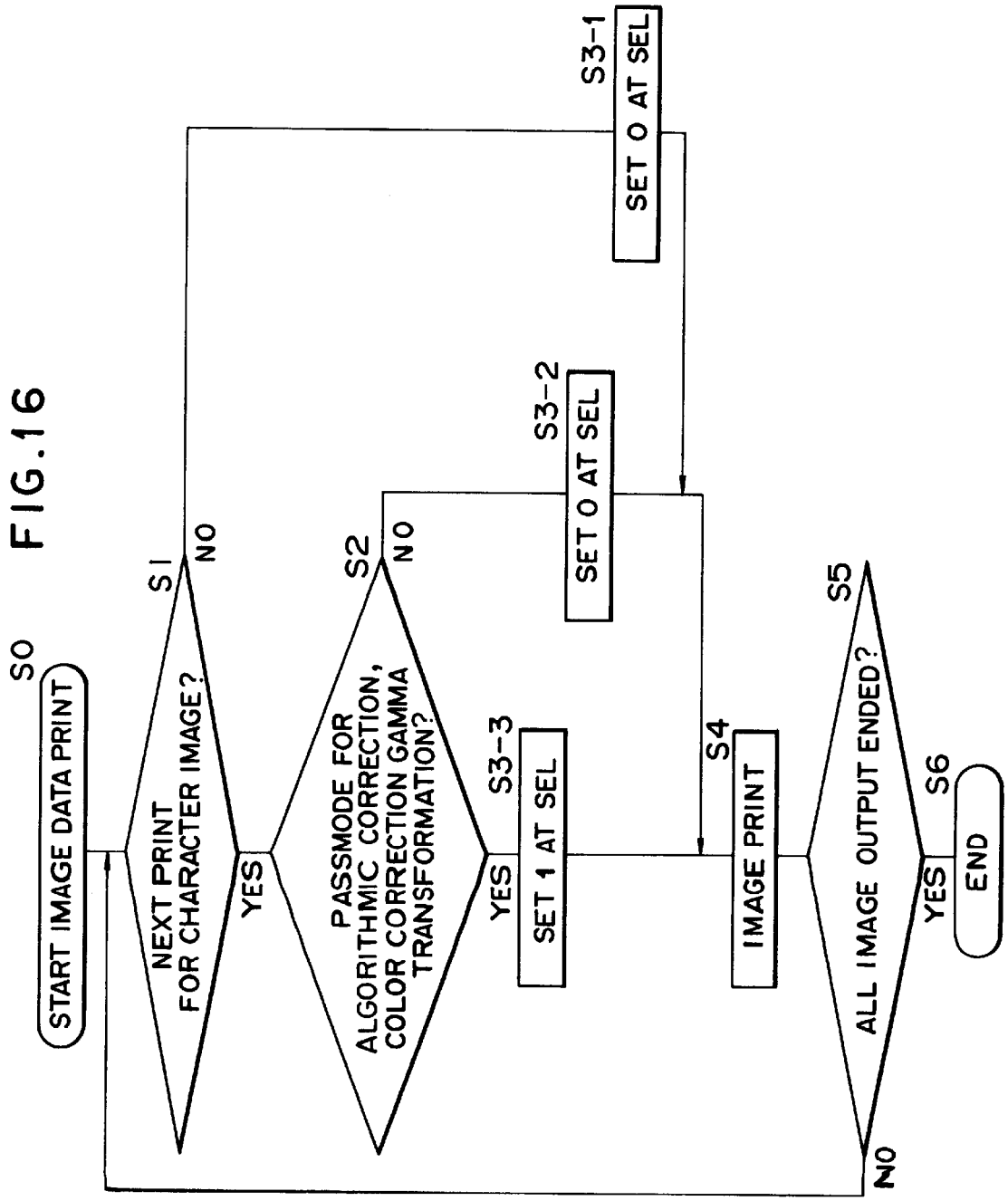
FIG. 16 is a flowchart showing the operation of the third embodiment of the invention.

FIG. 16 is a flowchart specifically showing the above operation.

First, binary image data as well as attributes are received page by page on a receiving end. These attributes determine whether the binary images are character images or images other than those. Printing of image data is then started (step S0).

Next, whether the attribute of an image to be printed pertains to a character image or not is determined (step S1). If it pertains to an image other than a character image, a "0" is set to SEL shown in FIG. 15 (step S3-1).

If, on the other hand, the attribute pertains to a character image, it is determined whether the binary image is in a mode in which it undergoes algorithmic correction, color correction, and gamma transformation (step S2). Despite the attribute pertaining to the character image, if the binary image is in a mode in which it does not undergo these corrections and transformation, a value other than a "0" or a "1" is set at the SEL (step S3-2). On the other hand, if the binary image is in a mode in which it undergoes the corrections and transformation, a "1" is set at the SEL (step S3-3).

Under these setting conditions, an image printer is actuated (step S4). Thus, in the multi-value converting unit 1 of FIG. 15, when a "1" is set at the SEL, the filter as shown in either FIG. 6(c) or FIG. 12(c) is selected.

Also, when the SEL contains a value other than a "0" or a "1" (when the SEL contains more than two bits), a filter other than the above is selected.

When a "1" is set at the SEL, an input value passes through the color correcting unit 2, the algorismic transforming unit 3, and the gamma transforming unit 4 shown in FIG. 15, being directly output.

Figure 17:
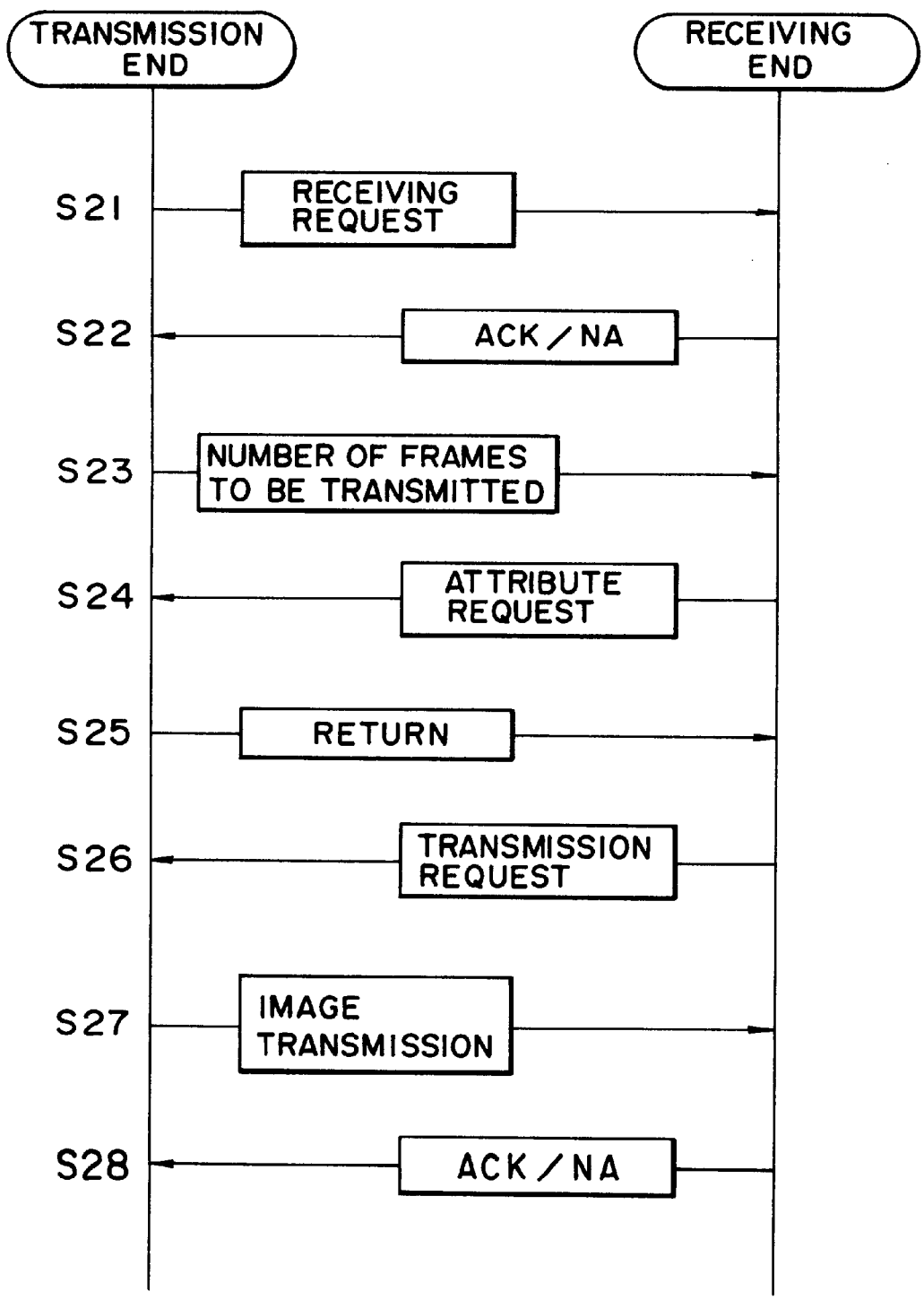
FIG. 17 is a schematic view showing the operation in which an attribute is received based on a protocol between both ends of image data transmission, this attribute determining whether or not a print image is a character image.

FIG. 17 shows the operation in which an attribute is received based on a protocol between both ends of transmission. This attribute determines whether or not a print image produced by the operation described above is a character image.

First, a receiving request is made from a transmitting end to a receiving end (step S21). When the receiving end is ready for receiving an image, an ACK is returned to the transmitting end so as to continue a receiving operation. On the contrary, when the receiving end is not ready for reception, an NA (non-acknowledge) is returned, the receiving request being completed (step S22).

Next, the transmitting end notifies the receiving end of the number of frames to be transmitted (step S23). An attribute request is made from the receiving end to the transmitting end (step S24). This attribute determines whether images corresponding to the number of frames to be transmitted are character images or images other than those. The transmitting end then notifies the receiving end of an attribute that has been determined (step S25).

A transmission request is made from the receiving end to the transmitting end (step S26). Only after these steps mentioned above, is image data transmitted (step S27).

After all the frames to be transmitted (in step S23) have been transmitted, the ACK indicating a normal end is returned from the receiving end to the transmitting end, or the NA indicating an abnormal end is returned. The transmission is thus completed.

The modes may be switched region by region within one page. The shape of a region is not limited to that described in the foregoing embodiments, but may be a rectangle or any other shape. The modes may also be switched pixel by pixel. In such a case, information for switching the modes may be received from the transmitting end. Needless to say, switching information is required which at least corresponds to pixels equal to the amount of one page with a binary image.

In the above embodiment, though data indicating the attribute of each image is transmitted from the transmitting end to the receiving end, the present invention is not limited to such a flow of data. Information concerning edges and the like may be extracted from a binary image on the receiving end. An image region is separated so as to switch modes, such as a character image mode, a half-tone image mode, and a mixed image mode. When switching information (image region separating information) corresponding to each pixel is generated on the transmitting end, an image region is not necessarily separated from binary image data. Instead, if a binary value coding unit on the transmitting end detects edges and characters of multi-value image data before this image data is binarized in order to separate the image region, this image region can be separated more precisely from the multi-value image data as compared when the image region is separated from the binary image. Thus, when a binary image is restored to a multi-value image, it is possible not only to preserve effectively the edges of a character, but also to restore effectively the gradation of a half-tone.

An image may be separated into two types of image regions, a character and a half-tone; and then sizes of windows and filter coefficients are accordingly switched when a binary value is restored to a multi-value data. An image may also be separated into three types of image regions, a character, a half-tone, and a mixed; and then sizes of windows and filter coefficients are switched accordingly when a binary value is restored to multi-value data. Moreover, an image may be separated into various types of image regions, and then various sizes of windows and filter coefficients are switched accordingly when a binary value is restored to multi-value data. It is thus possible to obtain images which have no indication of such switching.

In accordance with the embodiments described above, the deterioration of the resolution and edge of a character image can be reduced. The resolution and edge of a character and a line of an image where a character image mode and a half-tone image mode are mixed can be effectively preserved. This is achieved by switching, according to whether an image is a half-tone image, a character image, or a mixed image, sizes of windows and the contents of tables used for restoring binary image data to multi-value image data, or by rewriting the contents of the tables.

Another advantage is that a processing circuit is not required for each color in order to restore a binary image to a multi-value image by serially transferring a color image. Also, since restoration characteristics for colors remain almost the same during multi-value image restoration, if the contents of image tables containing the same value are used for this restoration, the capacity of tables can be reduced.

Furthermore, image data is made to undergo parallel processing only before, it reaches and after it passes the tables, thereby being capable of processing the image data at a speed four times faster than the access speed of the FIFO memory or line buffer. The image data can be output on a printer by a pipeline process in real time.

In accordance with the above embodiments, the tables are divided in order to process a binary image having a large size of a window. The outputs from the respective tables are added together not by the tables, but by the adders. In such a construction, the multiplication of the multiplication/ addition computation of fitering is performed based on the contents of the tables, whereas a part of addition of the multiplication/addition computation is performed by the adders.

According to the embodiments when the character image mode is selected in which the resolution and the edges of an image, such as a character image or a line image, are stressed, a filter capable of completely preserving the resolution and the edges can be employed. At this stage, the image does not undergo various processes, such as a color correction process for correcting color masking, an algorithmic transforming process, and a gamma transforming process, after the mutli-value restoring process, so as to prevent the deterioration of the resolution, the edges, and the dynamic range caused by the above various processes. It is thus possible to prevent a character image, a line image, and the like from deteriorating.

In accordance with the embodiments, by switching the processes or the contents of the tables in the processing unit, in which unit an N-value image is restored to an M-value image, an image process can be performed. This image process makes use of various types of image processing techniques and the performance of a high performance color printer or similar equipment.

In the character image mode in particular, an N-value image is directly output without being restored to an M-value image having many tones, or is output in the form of an M-value image by which a constant is multiplied in a manner that does not affect the operation, or is output without undergoing processes such as a color correcting process and an algorithmic transforming process. It is thus possible to prevent the deterioration of a character image, a line image or a similar image.

The present invention is not limited to the embodiments described above, but it will be understood that variations and modifications can be made within the scope of the claims below.

What is claimed is:

1. An image processing apparatus comprising:

input means for serially inputting n-value color image data in dot sequence, and for inputting through a communication from a transmitting apparatus, data representing a conversion mode including a character mode or a gradation mode for use in conversion of the n-value color image data to m-value color image data;

delaying means for delaying the n-value color image data in dot sequence input by said input means so as to delay it by an amount equal to several lines;

means for generating same-color-component data of the n-value color image data in dot sequence delayed by said delaying means and n-value color image data not yet delayed by said delaying means; and multi-value conversion processing means for performing a multi-value m (m>n) conversion processing according to whether an input mode is the character mode or the gradation mode, with the same color data as that generated by said generating means, wherein said multi-value conversion processing means performs conversion processes of different conversion characteristics for each of n-value color component data constituting n-value color image data in conversion of the n-value color image data to m-value color image data.

2. An apparatus according to claim 1, wherein m=8.

3. An image processing apparatus according to claim 1, wherein the n-value color image data is color sequential data.

4. An image processing apparatus according to claim 3, wherein the color sequential data is plural color component data.

5. An image processing apparatus according to claim 1, wherein the conversion mode is suitable for processing one of a character image and a halftone image.

6. An image processing apparatus according to claim 1, wherein said image processing apparatus is a facsimile machine.

7. An image processing apparatus according to claim 1, wherein the conversion mode is determined according to protocol exchanging.

8. An apparatus according to claim 1, wherein the n-value color image data is binary data.

9. An apparatus according to claim 1, wherein said multi-value conversion processing means executes conversion using a filter.

10. An apparatus according to claim 9, wherein said filter is switched according to a conversion mode.

11. An apparatus according to claim 9, wherein said filter is common for each color component.

12. An apparatus according to claim 9, wherein a filter is provided for each color component.

13. An apparatus according to claim 9, wherein said filter is provided according to a conversion mode.

14. An apparatus according to claim 9, wherein said filter has different filter coefficients for each conversion mode.

15. An image processing apparatus having a processing unit for converting N-value color image data to M-value color image data (N<M) according to a conversion mode input through a communication from a transmitting apparatus by negotiation when communication starts, wherein the conversion mode includes a character mode or a gradation mode, said apparatus comprising:

input means for sequentially inputting, color component by color component, the N-value color image data in dot sequence; and multi-value conversion processing means for subjecting the N-value color image data input from said input means to M-value (M>N) conversion processing for character mode or to M-value conversion processing for the gradation mode according to whether an input mode is in the character mode or in the gradation mode, wherein said multi-value conversion processing means performs conversion processes of different conversion characteristics for each of N-value color component data constituting N-value color image data in conversion of the N-value color image data to M-value color image data.

16. An image processing apparatus according to claim 15, wherein said multi-value conversion processing means converts the color components of the N-value color image data based on the same characteristics for each color component.

17. An image processing apparatus according to claim 15, wherein said multi-value conversion processing means converts the color components of the N-value color image data based on the different characteristics for respective color components.

18. An image processing apparatus according to claim 15, wherein the N-value data is binary image data.

19. An image processing apparatus according to claim 15, wherein the N-value data is image data represented by eight bits per pixel.

20. An image processing method comprising the steps of:

serially inputting n-value color image data in dot sequence;

inputting through a communication from a transmitting apparatus, data representing a conversion mode for use in conversion of the n-value color image data to m-value color image data, where m>n;

delaying the n-value color image data in dot sequence input in said inputting step so as to delay it by an amount equal to several lines;

generating same-color-component data of the n-value color image data in dot sequence delayed in said delaying step and input n-value color image data not yet delayed;

performing a multi-value m-conversion processing according to whether an input mode is the character mode or the gradation mode, with the same color data as that extracted in said extracting step, wherein said performing step includes performing conversion processes of different conversion characteristics for each of n-value color component data constituting n-value color image data in conversion of the n-value color image data to m-value color image data.

21. An image processing method for use in an apparatus having a processing unit for restoring N-value color image data to M-value color image data (N<M) according to a conversion mode input through a communication from a transmitting apparatus, said method comprising the steps of:

sequentially inputting, color component by color component, the N-value color image data in dot sequence; and sequentially subjecting the N-value color image data which is input in said inputting step to M-value conversion processing for character mode or to M-value conversion processing for the gradation mode according to whether an input mode is in the character mode or in the gradation mode, wherein said subjecting step includes performing conversion processes of different conversion characteristics for each of N-value color component data constituting N-value color image data in conversion of the N-value color image data to M-value color image data.

22. An image processing method for use in an apparatus having a processing unit for conversion of N-value image data to M-value image data (N<M) according to a conversion mode input through a communication from a transmitting apparatus, said method comprising the steps of:

sequentially inputting the N-value image data in dot sequence;

sequentially subjecting the N-value image data which is input in said inputting step to M-value conversion processing for character mode or to M-value conversion processing for the gradation mode according to whether an input mode is in the character mode or in the gradation mode, wherein said subjecting step includes performing conversion processes of different conversion characteristics for each of N-value color component data constituting N-value color image data in conversion of the N-value color image data to M-value color image data.

\* \* \* \* \*

UNITED STATES PATENT AND TRADEMARK OFFICE
CERTIFICATE OF CORRECTION

PATENT NO. : 6,222,950 B1
DATED : April 24, 2001
INVENTOR(S) : Sugiura et al.

It is certified that error appears in the above-identified patent and that said Letters Patent is hereby corrected as shown below:

Column 1,
Line 16, "an" should read -- a --.

Column 3,
Line 23, "shows" should read -- show --.

Column 5,
Line 36, "pseudo-hald-tone" should read -- pseudo-half-tone --.

Column 6,
Line 27, "in by" should read -- by an --.

Column 7,
Line 53, "so" should read -- so as --.

Column 8,
Line 33, "coefficient" should read -- coefficients --;
Line 38, "are is a" should read -- are --;
Line 41, "multi-value" should read -- multi-value data --;
Line 45, "multi-value." should read -- multi-value data. --; and
Line 48, "FIG. 2(c)" should read -- FIG. 6(c) --.

Column 9,
Line 17, "coefficient" should read -- coefficients --.

Column 10,
Line 34, "algorismic" should read -- algorithmic --.

UNITED STATES PATENT AND TRADEMARK OFFICE
CERTIFICATE OF CORRECTION

PATENT NO. : 6,222,950 B1
DATED : April 24, 2001
INVENTOR(S) : Sugiura et al.

It is certified that error appears in the above-identified patent and that said Letters Patent is hereby corrected as shown below:

Column 11,
Line 32, "a mixed;" should read -- mixed; --.

Column 14,
Line 14, "delayed;" should read -- delayed; and --; and
Line 50, "sequence;" should read -- sequence; and --.

Signed and Sealed this

Eleventh Day of June, 2002

Attest:

JAMES E. ROGAN
Attesting Officer   Director of the United States Patent and Trademark Office